(12) United States Patent
Roethig et al.

(10) Patent No.: US 9,794,979 B2
(45) Date of Patent: Oct. 17, 2017

(54) METHOD FOR ARBITRATION AND ADAPTIVE POWER-CYCLING IN A MULTI-CHANNEL NETWORK

(71) Applicant: QUALCOMM Incorporated, San Diego, CA (US)

(72) Inventors: Wolfgang Roethig, San Jose, CA (US); Jaeyoung Kwak, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 14/685,334

(22) Filed: Apr. 13, 2015

(65) Prior Publication Data

US 2016/0302257 A1    Oct. 13, 2016

(51) Int. Cl.
*H04W 76/04* (2009.01)
*H04W 52/02* (2009.01)
*H04W 72/04* (2009.01)
*H04W 72/12* (2009.01)
*H04L 5/00* (2006.01)

(52) U.S. Cl.
CPC ......... *H04W 76/048* (2013.01); *H04L 5/0005* (2013.01); *H04L 5/0041* (2013.01); *H04W 52/0216* (2013.01); *H04W 52/0251* (2013.01); *H04W 72/0453* (2013.01);
(Continued)

(58) Field of Classification Search
CPC ........... H04W 76/048; H04W 52/0251; H04W 72/0453; H04W 72/1263; H04W 52/0216; H04J 3/16; H04J 2011/0013; H04L 5/0005
USPC ....... 370/311, 254, 328, 329, 330, 359, 389, 370/392; 455/454, 515
See application file for complete search history.

(56) References Cited

U.S. PATENT DOCUMENTS 5,621,898 A    4/1997 Wooten
7,046,631 B1   5/2006 Giroux et al.
(Continued)

FOREIGN PATENT DOCUMENTS

EP            1986359 A1      10/2008
WO    WO 2014018072 A1 *   1/2014    .......... H04M 11/062
WO    WO-2014018072 A1      1/2014

OTHER PUBLICATIONS

Mullins R., et al., "Low-Latency Virtual-Channel Routers for On-Chip Networks," ISCA '04 Proceedings of the 31st annual international symposium on Computer architecture, 2004, pp. 1-10.
(Continued)

*Primary Examiner* — Charles C Jiang
*Assistant Examiner* — Wali Butt
(74) *Attorney, Agent, or Firm* — Loza & Loza, LLP

(57) ABSTRACT

A method, an apparatus, and a computer program product for data communication are provided. The method may include providing a plurality of data channels on a communications link, determining unused bandwidth as a difference between total bandwidth provided by the communications link and bandwidth used by the plurality of data channels, allocating the unused bandwidth to a virtual channel, scheduling the plurality of data channels and the virtual channel in accordance with a time-based multiplexing scheme, and disabling interface circuitry used to couple the transmitter to the communications link when the virtual channel is scheduled. Each of the plurality of data channels may be assigned to a source of data to be transmitted on the communications link.

26 Claims, 10 Drawing Sheets

(52) U.S. Cl.
CPC ....... *H04W 72/1263* (2013.01); *H04L 5/0053* (2013.01); *H04W 52/028* (2013.01); *Y02B 60/50* (2013.01)

(56) References Cited

U.S. PATENT DOCUMENTS

| | | | |
|---|---|---|---|
| 8,483,236 B2 | 7/2013 | Moratt et al. | |
| 2008/0117931 A1* | 5/2008 | Beukema | G06F 13/4208 370/468 |
| 2010/0260296 A1* | 10/2010 | Chorney | H04L 25/0262 375/357 |
| 2013/0195210 A1 | 8/2013 | Swarbrick et al. | |
| 2013/0286876 A1* | 10/2013 | Moratt | H04W 72/1242 370/252 |

OTHER PUBLICATIONS

Giroux N., et al., "Queuing and Scheduling; Quality of Service in ATM Networks, Chapter 5", Quality of Service in ATM Networks: State-of-the-Art Traffic, XX, XX, Jan. 1, 1998 (Jan. 1, 1998), pp. 96-121, XP002281068.
International Search Report and Written Opinion—PCT/US2016/021958—ISA/EPO—Jun. 17, 2016.
Krief F: "Green Networking", ProQuest Ebrary, Web. 26, Dec. 1, 2012 (Dec. 1, 2012), pp. 64-67, XP055275753, Retrieved from the Internet: URL:http://eu.wiley.com/WileyCDA/WileyTitle/productCd-1848213786.html [retrieved on May 26, 2016].

* cited by examiner

METHOD FOR ARBITRATION AND ADAPTIVE POWER-CYCLING IN A MULTI-CHANNEL NETWORK

TECHNICAL FIELD

The present disclosure relates generally to communication systems, and more particularly, to communications links connecting integrated circuit devices within an apparatus.

BACKGROUND

Digital communication interfaces provided between integrated circuit (IC) devices are provisioned with expanding bandwidth as device functionality and complexity increases. For example, mobile communications equipment may perform multiple diverse functions and provide capabilities using IC devices that include radio frequency transceivers, cameras, display systems, user interfaces, controllers, storage, and the like. General-purpose serial interfaces are known in the industry, ranging between the Inter-Integrated Circuit (I2C) interface providing bandwidth measurable in kilobits per second (Kbps), and high bitrate interfaces such as the Peripheral Component Interconnect Express (PCI-E) with bandwidths measurable in gigabits per second (Gbps).

Other examples are defined by industry standards such as the Ethernet standards that provide bandwidths of 10/100 megabits per second (Mbps), 1 Gbps, 10 Gbps, Universal Serial Bus (USB) standards that provide bandwidths between 1.5 Mbps and 10 Mbps, and multimedia standards such as standards and specifications defined by the Mobile Industry Processor Interface (MIPI) Alliance including the Display System Interface (DSI) and DigRF, standards defined by Electronic Industries Alliance (EIA) and/or the Consumer Electronics Association (CEA) including High-Definition Multimedia Interface (HDMI), and standards defined by the Video Electronics Standards Association (VESA) including DisplayPort.

In another example, the "Advanced Microcontroller Bus Architecture" (AMBA) on-chip interconnect defines an interface that may be used for connecting and managing functional blocks in a system-on-a-chip (SoC) or network-on-chip (NOC). AMBA includes the "Advanced eXtensible Interface" (AXI) that may connect one or more master devices to one or more slave devices.

The wide variety of serial interface standards results from the broad-ranging requirements of a large number of different applications. Depending on the application, or generation of an application, a choice of the most suitable interface must be made. For example the evolution of radio frequency (RF) technology from 3 G to 4 G to 50 G presents challenges related to the integration of new capabilities in mobile device chipsets, such as chipsets for Long Term Evolution (LTE) and/or wireless local area network" (WLAN or WiFi), including in relation to cost, performance and power consumption constraints.

Communications interfaces that connect components in a mobile devices can consume considerable portions of the power budgets of the mobile devices, and mobile communications devices and other devices may be configured to enter power saving modes of operation when such communications interfaces are idle. Mobile communications devices typically experience periods of increased peak bandwidth, with an average bandwidth usage that is well below the peak bandwidth. Accordingly, power usage schedulers and bandwidth usage schedulers may need to communicate in order to adapt to changing demands and usage of bandwidth. However, such communication between schedulers may introduce time lags and other inefficiencies in reacting to changing conditions.

As the demand for improved communications between devices continues to increase, there exists a need for improvements in methods for managing the interfaces between devices.

SUMMARY

Certain aspects of the disclosure relate to systems, apparatus, methods and techniques for implementing and managing digital communication interfaces that may be used between IC devices in various apparatus. Certain aspects provide systems, apparatus, methods and techniques for allocating bandwidth where contiguous time intervals can be created and scheduled for power saving purposes. In various aspects of the disclosure, a method, a computer program product, and an apparatus are provided. The method may include providing a plurality of data channels on a communications link, determining unused bandwidth as a difference between total bandwidth provided by the communications link and bandwidth used by the plurality of data channels, allocating the unused bandwidth to a virtual channel, scheduling the plurality of data channels and the virtual channel in accordance with a time-based multiplexing scheme, and disabling interface circuitry used to couple the transmitter to the communications link when the virtual channel is scheduled. Each of the plurality of data channels may be assigned to a source of data to be transmitted on the communications link.

Certain aspects relate to an apparatus that has interface circuitry adapted to couple the apparatus to a communications link, encoding circuitry configured to receive a data stream from each of a plurality of channels, and an arbiter. The arbiter may be configured to calculate unused bandwidth as a difference between total bandwidth provided by the communications link and bandwidth used by the plurality of channels, allocate the unused bandwidth to a virtual channel, and schedule the plurality of channels and the virtual channel in accordance with a time-based multiplexing scheme. At least a transmitter portion of the interface circuitry may be disabled when the virtual channel is scheduled.

Certain aspects relate to an apparatus that includes means for providing a plurality of data channels on a communications link, means for determining unused bandwidth as a difference between total bandwidth provided by the communications link and bandwidth used by the plurality of data channels, and means for scheduling the plurality of data channels and the virtual channel in accordance with a time-based multiplexing scheme. In interface circuitry used to couple the apparatus to the communications link may be disabled when the virtual channel is scheduled. Each of the plurality of data channels may be assigned to a source of data to be transmitted on the communications link. The unused bandwidth may be allocated to a virtual channel.

Certain aspects relate to a processor-readable storage medium that has stored thereon, one or more instructions. The processor-readable storage medium may be a transitory or non-transitory storage medium. When executed by at least one processing circuit, the instructions may cause the at least one processing circuit to provide a plurality of data channels on a communications link, determine unused bandwidth as a difference between total bandwidth provided by the communications link and bandwidth used by the plurality of data channels, allocate the unused bandwidth to a virtual channel, schedule the plurality of data channels and the virtual channel in accordance with a time-based multiplexing scheme, and disable interface circuitry used to couple the at least one processing circuit to the communications link when the virtual channel is scheduled. Each of the plurality of data channels may be assigned to a source of data to be transmitted on the communications link.

DETAILED DESCRIPTION

Figure 1:
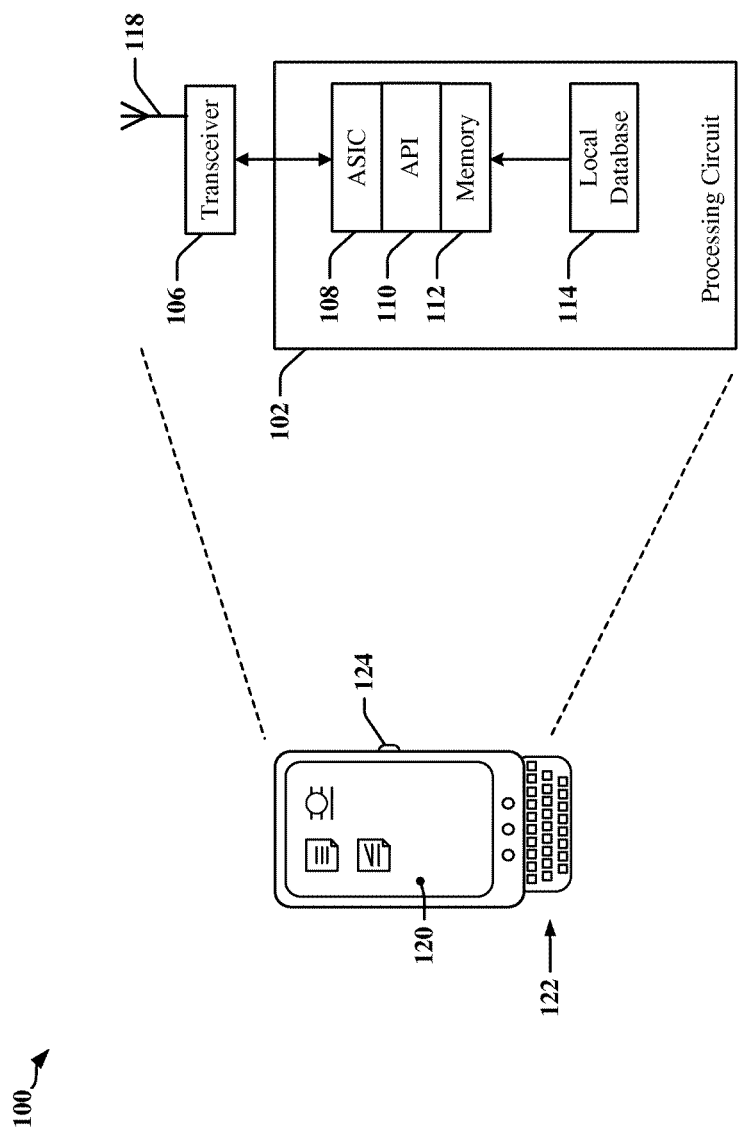
FIG. 1 depicts an apparatus employing a data link between integrated circuit devices that operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium, which may also be referred to as processor-readable media. Computer-readable media includes computer storage media. Storage media may be any available media that can be accessed by a computer. By way of example, and not limitation, such computer-readable media can include random access memory (RAM), read-only memory (ROM), electrically erasable programmable ROM (EEPROM), compact disc ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Overview

According to certain aspects disclosed herein, periodic and/or quasi-periodic data streams with known bandwidth may be aggregated and concentrated on a single communications link. In some instances, the communications link may include a serial bus such as a serial interface deployed between IC devices. Random traffic may be received for transmission over the communications link. The random traffic may include control traffic, for example. The random traffic may consume a small proportion of the bandwidth provided by the communications link. In some instances, the random traffic and/or control traffic may include traffic that has a low-latency requirement that is to be transmitted with limited delay.

In many applications, it is desirable to reduce power consumption of an apparatus. In one example, power consumption may be reduced when the frequencies of clocking signals provided to circuits associated with the communications interface are decreased. In another example, power consumption may be reduced when certain circuits associated with the communications interface are powered-down. In another example, power consumption may be reduced when line drivers are placed in a high impedance state such that current flows in the communications link are curtailed or terminated.

Certain aspects disclosed herein relate to arbitration and scheduling of traffic transmitted over a multi-channel communications link. A processing circuit may monitor, measure, calculate and/or model unused bandwidth. The unused bandwidth may be assigned to a virtual data channel that can be scheduled along with data channels that provide periodic and/or random data for transmission on the communications link. The virtual channel may be used to identify a power-down period in a power cycle that is statically or dynamically configured for the communications link. The power-cycle may be configured based on traffic characteristics and latency requirements of one or more data channels. Scheduling may include arbitrating access between the defined channels, including the data channels and the virtual channel.

Certain aspects disclosed herein provide a scalable scheduling/arbitration that can be applied to N channels without a theoretical upper limit for N. Arbitration and scheduling methods are described that can optimally schedule data traffic and power cycle by formulating associated data stream arbitration and power cycle requirements in a single process. Complexities arising from interactions of separate data stream arbitration and power cycling schedules can be eliminated. In one example, scalable and efficient arbitration may include the use of a first-come-first-serve scheduling algorithm that permits back-to-back data transfers to be performed without an intervening arbitration cycle. In this example, virtually 100% bandwidth utilization is enabled when the arbitration/scheduling is applied to arbitration only, and power savings are realizable when unused bandwidth is scheduled for power-cycling purposes.

Example of a Device with Multiple IC Device Subcomponents

Certain aspects of the invention may be applicable to communications links deployed between electronic devices, including subcomponents of an apparatus such as a telephone, a mobile computing device, an appliance, automobile electronics, avionics systems, wearable computing devices, appliances, etc. FIG. 1 depicts an example of apparatus 100 that may employ a communication link between IC devices. In one example, the apparatus 100 may include a wireless communication device that communicates through an RF communications transceiver 106 with a radio access network, a core access network, the Internet and/or another network. The communications transceiver 106 may be operably coupled to a processing circuit 102. The processing circuit 102 may have one or more IC devices, such as an application-specific IC (ASIC) 108. The ASIC 108 may include one or more processing devices, logic circuits, and so on. The processing circuit 102 may include and/or be coupled to processor-readable storage such as a memory device 112 that may maintain instructions and data that may be executed by processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include ROM or RAM, EEPROM, flash cards, or any memory device that can be used in processing systems and computing platforms. The processing circuit 102 may include or access a local database 114 that can maintain operational parameters and other information used to configure and operate apparatus 100. The local database 114 may be implemented using one or more of a database module, flash memory, magnetic media, EEPROM, optical media, tape, soft or hard disk, or the like. The processing circuit may also be operably coupled to external devices such as an antenna 118, a display 120, operator controls, such as a button 124 and/or an integrated or external keypad 122, among other components.

Examples of Communications Links Provided Between IC Devices

Figure 2:
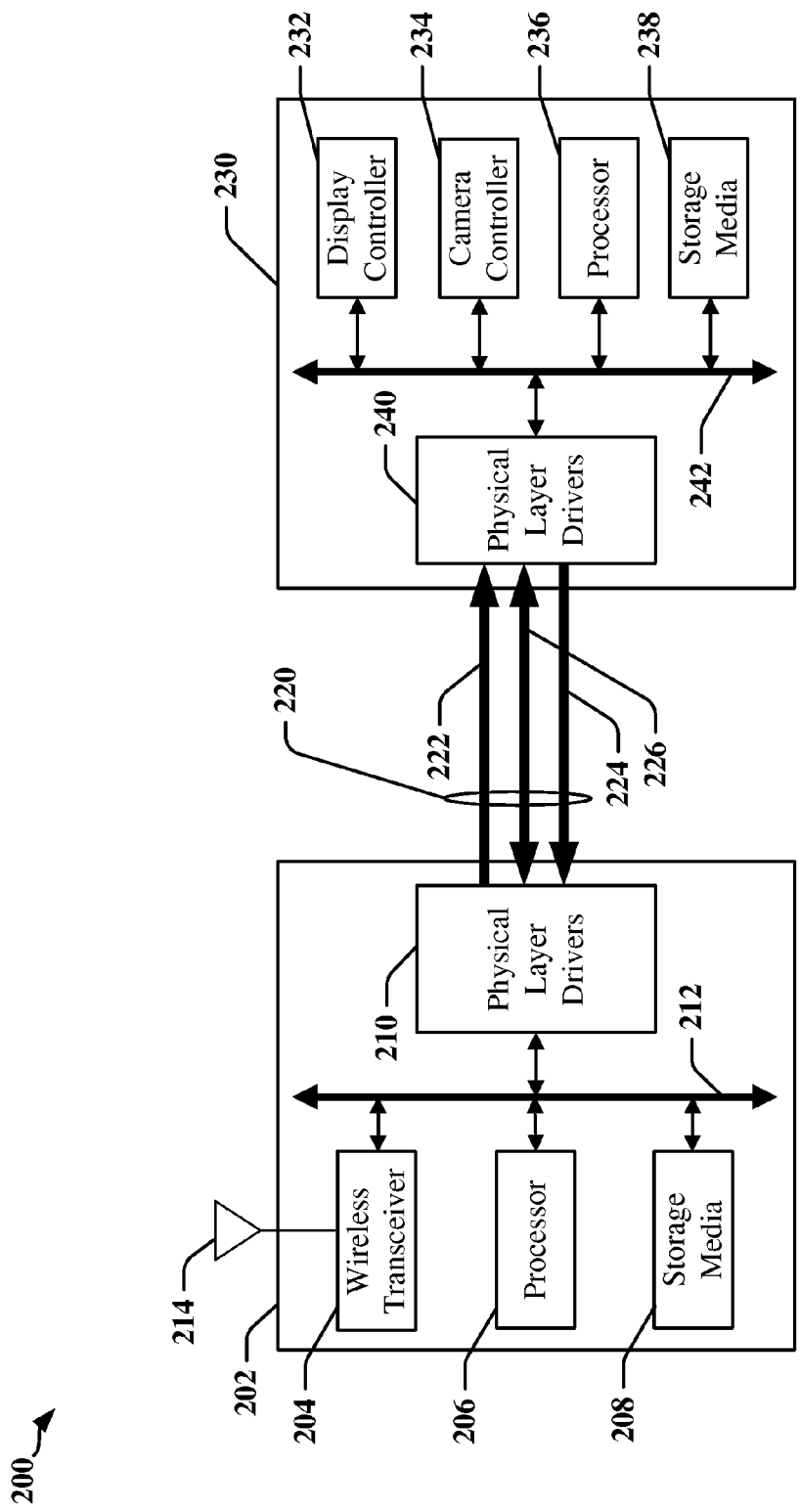
FIG. 2 illustrates a data communications link that may be provided to connect IC devices within an apparatus, and that may be adapted in accordance with certain aspects disclosed herein.

FIG. 2 is a block schematic diagram illustrating a communications link 220 that may be provided to connect IC devices 202, 230 within a system 200 (e.g., the apparatus 100 of FIG. 1), and that may be adapted in accordance with certain aspects disclosed herein. The system 200 may be embodied in, or include a wireless mobile device, a mobile telephone, a mobile computing system, a wireless telephone, a notebook computer, a tablet computing device, a media player, a wearable computing device, an appliance, a gaming device, or the like. The communication link 220 may be used to connect IC devices 202 and 230 that are provided in close proximity to one another within a single device, or dispersed among physically distinct components that may be physically located remotely from one another. In one example, the system 200 is embodied in a single device, which includes a plurality of IC devices 202 and 230 that exchange data and control information through the communication link 220. In another example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection that connects physically distinct devices or subsystems.

The communication link 220 may include multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward link 222 while a second communications channel 224 may be referred to as a reverse link 224. The first IC device 202 may be designated as a host system or transmitter, while the second IC device 230 may be designated as a client system or receiver, even if both IC devices 202 and 230 are configured to transmit and receive on the communications link 222. In one example, the forward link 222 may operate at a higher data rate when communicating data from a first IC device 202 to a second IC device 230, while the reverse link 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the system 200, including maintaining wireless communications through a wireless transceiver 204 and an antenna 214, while the second IC device 230 may support a user interface that manages or operates a display controller 232. The first IC device 202 or second IC device 230 may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processing devices 206 and 236, and/or other components of the IC devices 202 and 230. Communication between each processing device 206, 236 and its corresponding storage media 208 and 238 and other modules and circuits may be facilitated by one or more bus 212 and 242, respectively.

The reverse link 224 may be operated in the same manner as the forward link 222, and the forward link 222 and reverse link 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional link 226 may support communications between the first IC device 202 and the second IC device 230. The forward link 222 and/or reverse link 224 may be configurable to operate in a bidirectional mode when, for example, the forward and reverse links 222 and 224 share the same physical connections and operate in a half-duplex manner. In one example, the communication link 220 may be operated to communicate control, command and other information between the first IC device 202 and the second IC device 230 in accordance with an industry or other standard.

In one example, the forward and reverse links 222 and 224 may be configured or adapted to support a wide video graphics array (WVGA) 80 frames per second LCD driver IC without a frame buffer, delivering pixel data at 810 Mbps for display refresh. In another example, the forward and reverse links 222 and 224 may be configured or adapted to enable communications between with dynamic random access memory (DRAM), such as double data rate synchronous dynamic random access memory (SDRAM). Encoding devices 210 and/or 230 can encode multiple bits per clock transition, and multiple sets of wires can be used to transmit and receive data from the SDRAM, control signals, address signals, and so on.

The forward and reverse links 222 and 224 may comply with, or be compatible with application-specific industry standards. In one example, the MIPI standard defines physical layer interfaces between an application processor IC device 202 and an IC device 230 that supports the camera or display in a mobile device. The MIPI standard includes specifications that govern the operational characteristics of products that comply with MIPI specifications for mobile devices. The MIPI standard may define interfaces that employ complimentary metal-oxide-semiconductor (CMOS) parallel busses.

In one example, the communication link 220 of FIG. 2 may be implemented as a wired bus that includes a plurality of signal wires (denoted as N wires). The N wires may be configured to carry data encoded in symbols, where clock information is embedded in a sequence of the symbols transmitted over the plurality of wires.

Figure 3:
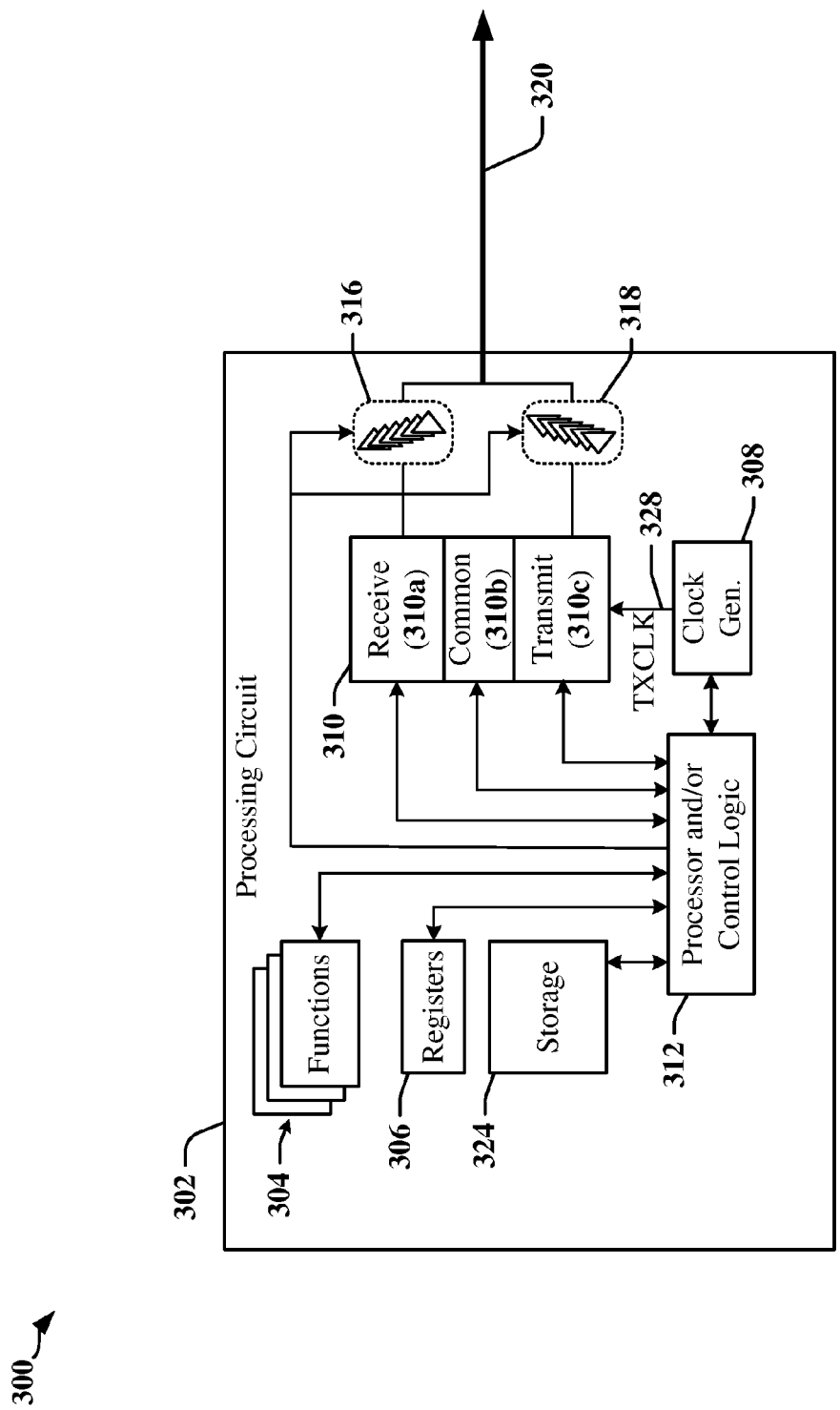
FIG. 3 is a diagram that illustrates a simplified system architecture for an apparatus coupled to a data communications link according to certain aspects disclosed herein.

FIG. 3 is a block schematic diagram illustrating a generalized example of an architecture for a device 300 that may be adapted in accordance with certain aspects disclosed herein. The device 300 may include a processing circuit 302 configured to manage one or more functional elements 304, such as sensors, input/output devices, user interface devices, imaging devices, wireless communications circuitry, and so on. The processing circuit 302 may include one or more transceivers 310, drivers 316 and receivers 318 that may be adapted to couple the processing circuit 302 to a communications link 320. The communications link 320 may be one of a plurality of data links coupled to the device 300 and used to interconnect the device 300 to one or more devices and/or processing circuits in a system. In some examples, the communications link 320 may be provided between IC devices within an apparatus. In some examples, the communications link 320 may connect physically distinct apparatuses.

The communications link 320 may be configured according to application needs. The communications link 320 may carry multiple channels of data traffic that share the communications link 320 using time-based multiplexing, for example. In one example, a time-division multiplexing (TDM) scheme may be employed to transmit data from multiple sources over a common communications link 320, such that data from each source is transmitted in a signal that is present on the communications link 320 for a fraction of a time period, which may be defined as a scheduling period, and/or power-cycle period. In another example, a statistical multiplexing scheme or dynamic bandwidth allocation scheme may be used, in which the communications link 320 is apportioned into a number of variable bit-rate channels or data streams, in accordance with traffic demands. In a time-based multiplexing scheme, each data source may be allocated a channel, and a stream of data from the data source may be provided in packets that are transmitted asynchronously on a first-come, first-served basis. In some instances, packets may be transmitted in accordance with a scheduling algorithm that provides fairness, differentiated service and/or guaranteed quality of service.

In some instances, one or more functions 304 may be provided with prioritized access to the communications link 320. Low-latency and/or high priority traffic may share the communications link 320 with lower-priority traffic, and/or with traffic that includes occasional, infrequent or random data transmission. For example, low data rate, infrequent control data may share the communications link 320 with video streaming data that is characterized by high volume data and/or time sensitive data.

In one example, the processing circuit 302 may be adapted to provide a sensor control function 304 that manages an image sensor, for example. In another example, the processing circuit 302 may be adapted to provide sensor control functions 304 that monitors one or more environmental conditions, the operational state of a machine, etc. The processing circuit 302 may include configuration registers 306 and/or other storage devices 324, a processor and/or control logic 312, a transceiver 310 and a number of line driver circuits 316 and/or receiver circuits 318, as needed to couple the processing circuit 302 to the communications link 320. The processor and/or control logic 312 may include a state machine, sequencer, signal processor or general-purpose processor, for example. The transceiver 310 may include one or more receivers 310a, one or more transmitters 310c and certain common circuits 310b, including timing, logic and storage circuits and/or devices. In some instances, the transceiver 310 may include encoders and decoders, clock and data recovery circuits, and the like. A transmit clock (TXCLK) signal 328 may be provided to the transmitter 310c, where the TXCLK signal 328 can be used to determine data transmission rates.

The communications link 320 may support unidirectional, bi-directional half-duplex or full-duplex modes of communication. Transmissions on the communications link 320 may be compatible with, or compliant with one or more communications standards, protocols and signaling specifications.

Multi-Channel Arbitration

Certain aspects of the disclosure relate to a multi-access data communications link configured to support data transmissions between a plurality of functional components. At an originating device (i.e., the transmitter), arbitration circuits and/or logic may schedule access to the data communications link for certain types of traffic and may provide on-demand access to the data communications link for other types of traffic.

Figure 4:
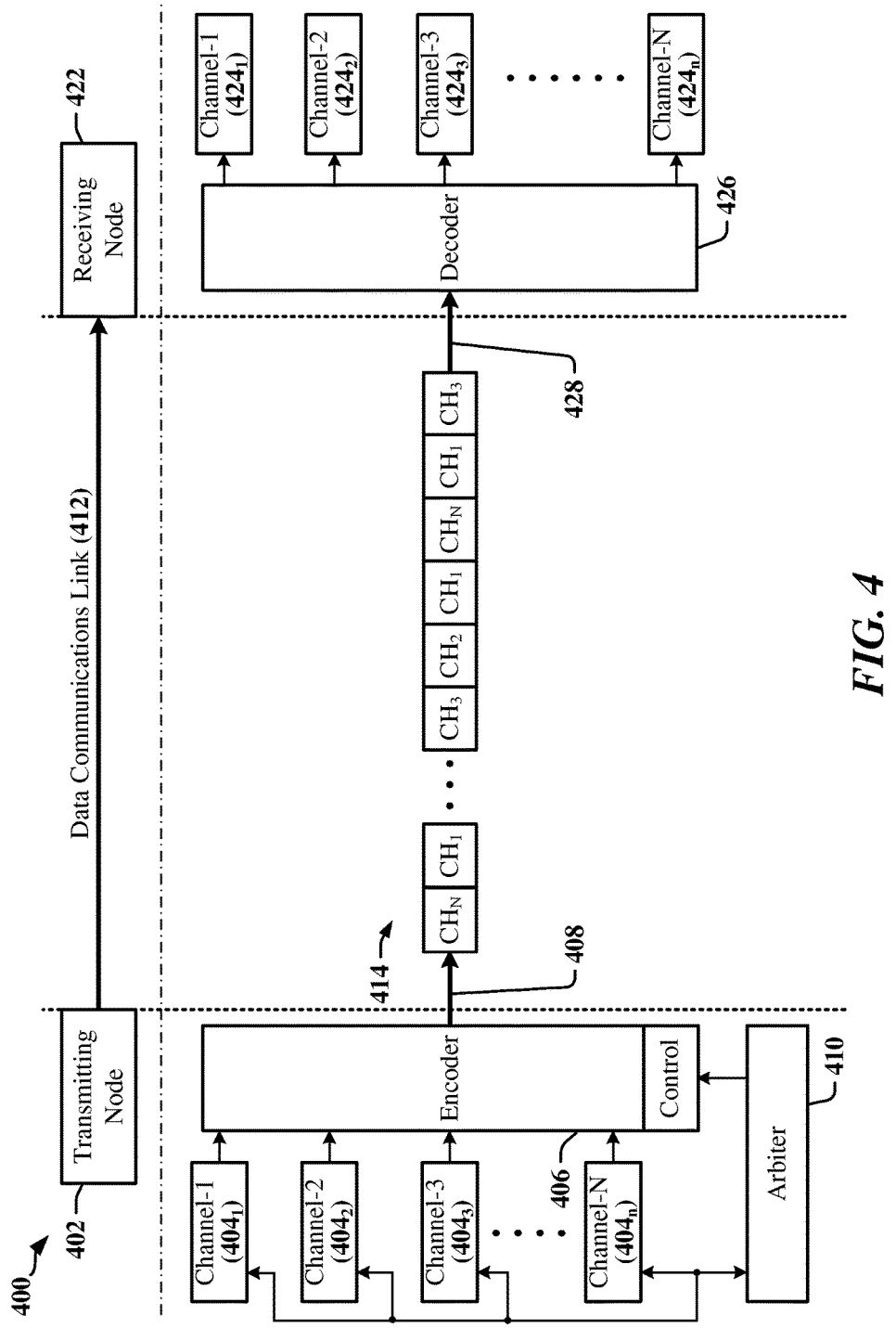
FIG. 4 illustrates certain aspects of time-based multiplexing on a data communications link.

FIG. 4 is a simplified timing diagram 400 that illustrates certain aspects of a data communications link 412 adapted according to certain aspects disclosed herein. The communications link 412 may support multiple access data communications between a transmitting node 402 and a receiving node 422. In one example, the communications link 412 may be configured as a bus that couples a plurality of devices, in which each device coupled to the communications link 412 may be allocated one or more time slots on the communications link 412, and/or may negotiate or compete for access using an arbitration protocol.

In the example depicted, a plurality of functions within a single device or processing circuit may communicate through a common communication interface. An encoder 406 may be employed to aggregate, encode, and/or transmit data provided by each of the plurality of functions/sources in corresponding transmission slots 414 and in accordance with scheduling and control information provided by an arbiter 410. In operation, the communications link 412 may provide multiple data channels that may be transmitted in one or more slots of a sequence of transmission slots 414. Data transported on the communications link 412 may be associated with a predominantly deterministic rate. In one example, a communications link 412 within a wireless communication device may allocate data channels for traffic associated with one or more radio access technologies (RATs) including cellular and WiFi RATs, uncompressed audio/video streams, and other types of traffic. Data provided by the multiple data sources and/or channels $404_1$-$404_n$ may be accumulated and/or concentrated at the transmitting node 402. In one example, the encoder 406 may packetize data from the multiple channels $404_1$-$404_n$ and transmit the packets in accordance with a schedule generated or implemented by the arbiter 410. At the receiving node 422, data may be decoded and/or extracted from the packets transmitted over the communications link 412, and the de-packetized data may be distributed to their respective multiple destination data channels $424_1$-$424_n$.

The arbiter 410 implemented at the transmitting node 402 may determine the order in which data is transferred and schedules data transmissions. The arbiter 410 may be configured to efficiently use the available bandwidth provided by the communications link 412, while meeting latency objectives and expectations. The available bandwidth may be calculated as the number of bits that can be transferred over the communications link 412 in a given time period, and the throughput of the communications link 412 may be a measure of the data from the various channels $404_1$-$404_n$ that can be transmitted, excluding overhead bits such as bits or transmissions associated with protocol headers, arbitration and synchronization. Efficiency of bandwidth usage may be estimated based on the relationship or ratio of throughput to available bandwidth.

Scheduling Considerations Related to Latency and Buffer Size

Latency may be calculated as the time elapsed between the capture of data from a source data channel $404_1$-$404_n$ and the arrival of the data at a destination data channel $424_1$-$424_n$. Latency may include time periods introduced by data accumulation (buffering) in a queue or the like, scheduling delays related to the time a packet waits for a transmission slot 414, transmission time ("time of flight") related to the structure of the communications link 412, and the time between reception at the receiving node 422 and dispatch to the final destination for the data. Typically, a trade-off is made between latency and efficiency of bandwidth usage. For example, the use of large buffers or queues may permit data to be transferred in large chunks without gaps and/or padding, thereby increasing the efficiency of bandwidth usage. Large buffers or queues can increase hardware costs and increase latency, and may be affect certain data that can tolerate limited latency due to processing constraints.

The arbiter 410 may manage a transmission schedule for data from multiple channels $404_1$-$404_n$ through the use of an arbitration algorithm, which can significantly affect both latency and required buffer size. The arbitration algorithm may be adapted or configured according to application needs. In one example, the arbitration algorithm may be configured to optimize latency and buffer size using a "first-come-first-serve" approach to scheduling. Latency for packets waiting in a buffer or queue may be increased when packets are scheduled out-of-order, and increased capacity of the buffers or queues may be needed to accumulate data, which may be provided by a corresponding one of the channels $404_1$-$404_n$ in a data stream that has a constant or nearly constant rate. In the latter scenario, buffers may be sized based on the worst-case latency produced by out-of-order scheduling.

Power Cycling

In mobile communications devices and mobile computing devices, power consumption is generally a concern that is prominently addressed in the design of the devices. Communications interfaces may consume considerable energy and can reduce operational time of the mobile device between battery charging events. Accordingly, it may be desirable to power down the communications interfaces when a device is placed in a low-power state. The low-power state may be initiated when data is not actively transmitted or received over the communications link 412. In one example, bandwidth usage (BWU) may amount to 40% of the available bandwidth and the device can, in theory, power down its communications interface 60% of the time. In practice, data can be continuously received from one or more channels $404_1$-$404_n$, including during periods in which the communications interface is powered down. Accordingly, latency can be increased for data that is packetized and ready for transmission when the communications interface is powered down. The latency may depend on the duration of a power cycle.

Figure 5:
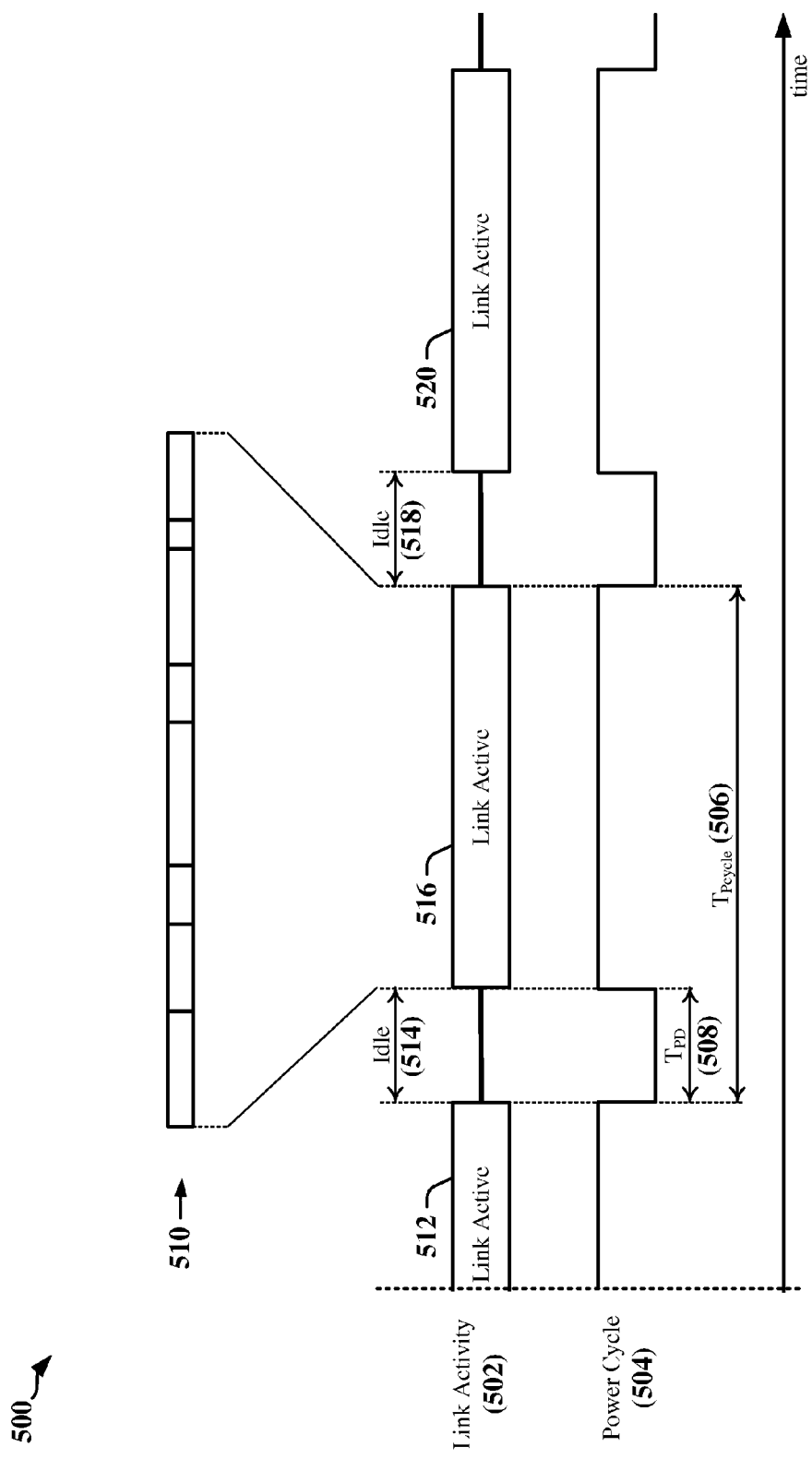
FIG. 5 illustrates certain aspects of power cycling on a data communications link.

FIG. 5 is a timing diagram 500 that illustrates certain aspects of power cycling. In the example, a communications link 412 (see FIG. 4) may exhibit periods of activity 512, 516, 520, and idle periods 514, 518 attributable to a power cycle. During a single active period 512, 516, or 520, one or more packets 510 may be transmitted on the communications link 412. Link activity 502 may be dictated by a power cycle 504 implemented based on power conservation needs, observed rates of data generated by channels $404_1$-$404_n$, observed buffer utilization, and other factors. The power cycle 504 may be related to a maximum packet rate (MPR). For example, when MPR is 1 packet per microsecond, the power cycle 504 may be configured to support transmission of 1 packet every microsecond. That is, the period ($T_{Pcycle}$) 506 of the power cycle 504 may be set to less than 1 microsecond to allow each arriving packet to be transmitted before the next packet arrives for transmission. The duration ($T_{PD}$) 508 of the idle time period may be selected based on the transmission time of the maximum sized packet. In some instances, power cycling is more efficient when power cycles 504 have longer periods 506. In one example, a period 506 of 10 microseconds with an idle duration of 6 microseconds may be more efficient than a period 506 of 1 microsecond and with an idle duration of 0.6 microseconds.

Conflicts and inefficiencies may develop when power cycling schedules conflict or interfere with the transmission schedules applied by the arbiter 410. Changes in the data flows received from one or more channels 404₁-404ₙ may require adjustment of the duration of the period 506 of the power cycle 504 and/or proportionate changes in the duration 508 of the idle time period with respect to the period 506 of the power cycle 504. In some instances, increases in the MPR may require a shortening of the period 506 of the power cycle 504. In one example, the MPR may vary when video streams are derived from a video image of a scene in which motion commences or terminates. In another example, the volume of a data flow received from one or more channels 404₁-404ₙ may change over time, and the ratio of the duration 508 of the idle time period to the period 506 of the power cycle 504 may be modified to control buffer utilization.

Changes in the configuration of the power cycle 504 are typically communicated to the arbiter 410 to permit the arbiter 410 to adjust its scheduling algorithm in order to accommodate variances in the available bandwidth and/or duration of active transmission periods. Changes in the scheduling algorithm employed by the arbiter 410 may affect conditions used to configure the power cycle 504. Accordingly, the power cycle 504 and scheduling algorithm may be iteratively modified until a balance is attained. Schedulers used by the arbiter 410 and to control the power cycle 504 may need to be in communication with one another in order to more rapidly converge on a balance between power cycling and transmission scheduling. The communication overhead and delays in achieving balance may reduce the efficiency of both power usage and the communications interface. In some instances, the power cycle may be operated independently of the transmission schedule such that a power down may occur while a packet is being transmitted.

Adaptive Power Cycling

A scheduling algorithm used by the arbiter 410 may be adapted in accordance with certain aspects disclosed herein to provide an adaptive power cycling mechanism. In one example, power cycling requirements may be satisfied by establishing a virtual data flow from a virtual channel that causes the arbiter to schedule a time period corresponding to the virtual channel. The communications interface can be powered down when the virtual channel is scheduled.

Figure 6:
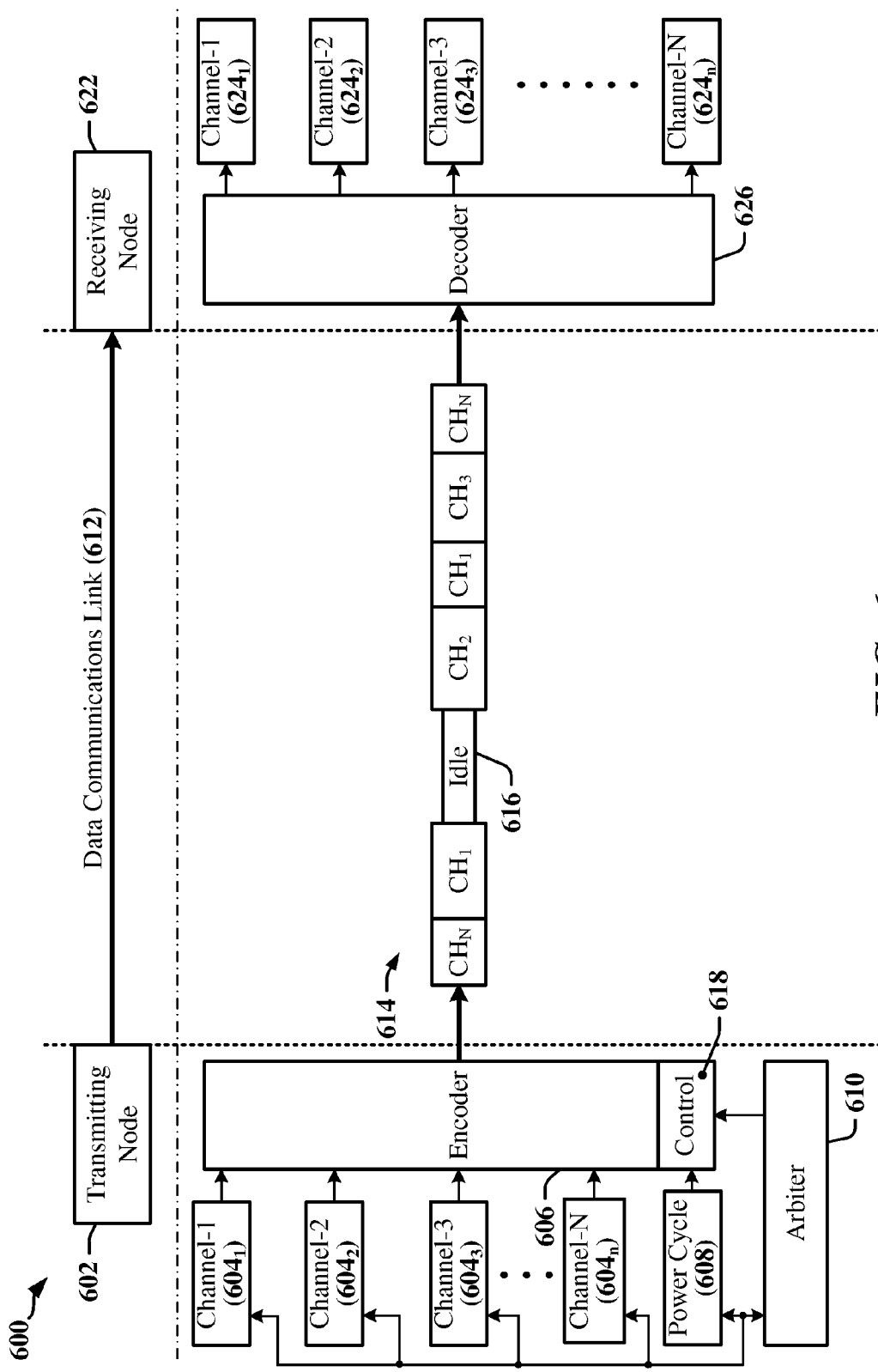
FIG. 6 illustrates a data communications link configured for adaptive power cycling in accordance with certain aspects disclosed herein.

FIG. 6 is a simplified timing diagram 600 that illustrates certain aspects of a data communications link 612 configured for adaptive power cycling in accordance with certain aspects disclosed herein. As with the communications link 412 of FIG. 4, the communications link 612 may support transmission of data received at a transmitting node 602 from multiple data sources and/or channels 604₁-604ₙ. The encoder 606 may packetize data from the multiple data channels 604₁-604ₙ and transmit the packets 614 to a receiving node 622 in accordance with a schedule generated by the arbiter 610. In this example, variable-length packets 614 are transmitted on the data communications link. In other examples, each of the data channels 604₁-604ₙ may be assigned for transmission in one or more time slots in each power cycle. At the receiving node 622, data may be decoded and/or extracted from the packets transmitted over the communications link 612, and the de-packetized data may be distributed to their respective multiple destinations 624₁-624ₙ.

In this example, the arbiter 610 may be adapted to service requests from a power cycle channel 608 that facilitates the power cycle requirement for the transmitting node 602. The power cycle channel 608 may be a virtual channel that produces no actual data for encoding. When the power cycle channel 608 is scheduled for transmission, the communication interface of the transmitting node 602 may be powered down. Accordingly, an idle period 616 occurs in the stream of packets 614 transmitted by the transmitting node 602 to the receiving node 622.

In operation, the power cycle channel 608 is granted access to the communication link by a scheduling algorithm employed by the arbiter 610. The scheduling algorithm need not be aware of the nature of the power cycle channel 608, since it schedules the power cycle channel 608 in the same way the other data channels 604₁-604ₙ are scheduled. Control logic and/or circuits 618 may be adapted to power down the communications interface and/or encoder when the power cycle channel 608 is scheduled.

The power cycle channel 608 may request service at regular intervals corresponding to the period associated with a packet rate in a data channel, and the power cycle period may be considered in the calculation of the MPR for the communications link 612. The power cycle channel 608 may be allocated bandwidth corresponding in size to the unused bandwidth of the communication link. The scheduling algorithm may be configured to schedule the power cycle channel 608 in a single contiguous period of time within a period determined based on the MPR.

According to certain aspects, initiation of power-down events may be delayed until a previous packet has completed transmission because the power cycle channel 608 is scheduled in the same manner as actual data channels 604₁-604ₙ. In other words, the power cycle channel 608 receives a grant (of access to the communication link 612) from the arbiter 610 after a grant to one of the data channels 604₁-604ₙ has been terminated. The duration of the grant to the power cycle channel 608 may be controlled using a timer, since an actual packet is not transmitted.

In some instances, a message or signal may be transmitted to a receiver at the commencement of power-down period such that the receiver can power down its interface. For example, the transmitter may send a power-down message that indicates a duration of the power-down period. The receiver may power down its interface for a period of time that is less than or equal to the power-down period, and may reactivate the interface in time to receive a next transmission from the transmitter. Power-down periods may be initiated by switching off power supplied to the interface of the transmitter and/or receiver circuits. In some examples, power-down periods may be initiated by placing line drivers in a high impedance state. In some examples, power-down may be initiated by suspending or reducing the frequency of transmitter and/or receiver clock signals for the duration of the power down period.

Example of Adaptive Power Cycling

The power cycle channel 608 may be implemented using a combination of modules and circuits that may include state machines, processing circuits, counters, registers and control logic. Certain parameters related to or characterizing the communication link may be determined at system start-up. The parameters may define the number of active channels associated with the communication link, the bandwidth (BW[ch]) granted to or required by each of the data channels $604_1$-$604_n$, packet rate (PR[ch]) of each of the data channels $604_1$-$604_n$, total available bandwidth ($BW_{max}$) provided by the communication link, and so on. The arbiter 610 and/or a scheduling algorithm used by the arbiter 610 may be configured based on the parameters. For example, the MPR used to set the power cycle may be calculated as MPR=max (PR[ch]), and the power cycle channel 608 may be characterized as having a bandwidth requirement or grant calculated as $BW_{Pcycle}=BW_{max}-sum(BW[ch])$. These parameters and the configuration of the arbiter 610 and/or scheduling algorithm may be adjusted when a channel is added or removed, and/or when the bandwidth or packet rate is modified for one or more channels.

The power cycle channel 608 may include one or more counters that track the interval between power cycle requests, where the interval may be calculated as 1/MPR. For example, a count-down counter may be initialized to have the value 1/MPR and a power cycle request may be generated when the count-down counter has been decremented until it reaches zero. A power-down counter may be used to track the duration of a power-down period. The duration of the power-down period may be calculated as (1−BWU)/MPR, and the power-down counter may be initiated when the power-down cycle request is granted.

Upon expiration of the duration of a power-down period, the power-down counter may trigger a power-on sequence to reactivate the communication interface. For example, signal detection circuits, line drivers, receivers, the encoder 606, etc. may be powered on or otherwise reactivated. In some devices, reactivation may not or cannot be instantaneously accomplished, and an activation time needed to reactivate the communication interface may be provided to the arbiter 610. The activation time may be known from the design of the interface and/or by characterization of operations. The power cycle duration and/or power-down period may be adjusted to accommodate the activation time and other overhead.

The arbiter 610 may account for other overhead such as random control traffic that may be inserted between data packets transmitted during the link active period. A monitor may be employed to measure the time associated with such traffic, and the overhead may be expressed as overhead time for each power cycle period. The overhead time may also be deducted from the effective power cycle duration.

In some examples, adaptive power cycling may respond to multiple dynamically changing parameters. The interval between power cycling requests can be adapted based on application and/or operational needs. For example, the interval between power cycling requests may be increased during slow traffic, such that the rate of switching between power-on and power-off states is reduced and power cycling efficiency is increased.

The duration of each power cycle may be adapted to handle control traffic. In one example, the power cycle duration may be shortened to accommodate control traffic when requests for transmitting control packets are assigned a higher priority than requests from the power cycle channel 608. The power cycle duration may be shortened by the amount of control traffic observed in the previous active period, for example. Power cycle depth (duration of power-down period) can be adapted based on observed link conditions. The power cycle duration may be known at the beginning of the power cycle, and the arbiter 610 or other control logic 618 may determine whether there is enough time for a deeper power cycle that can increase power savings. In some instances, the arbiter 610 or other control logic 618 may determine that the calculated power cycle duration is too short for efficient power cycling and the communication link may remain active until activity levels of the communication link decline.

Arbiter Example

Figure 7:
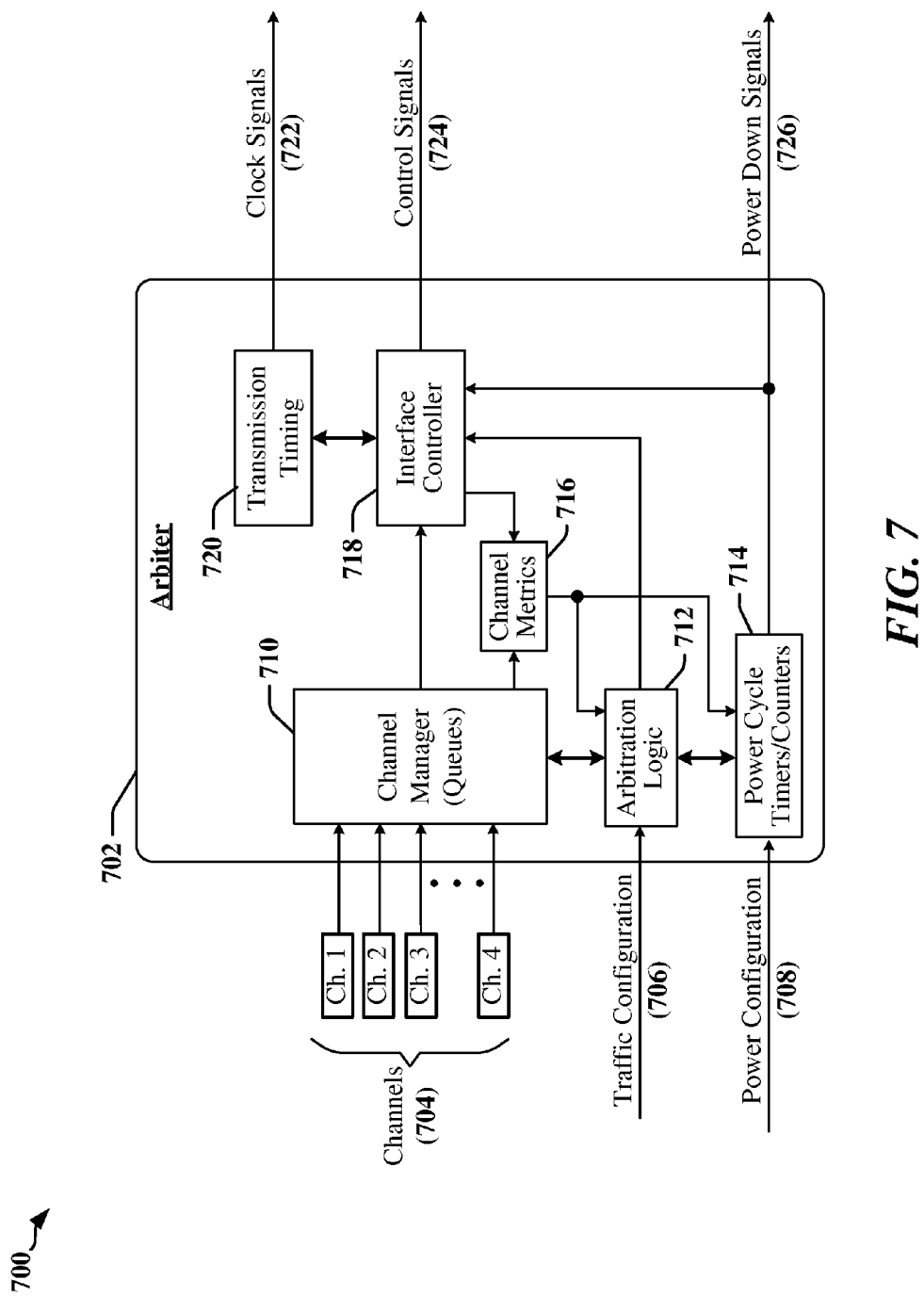
FIG. 7 illustrates an arbiter adapted or configured to manage traffic and power cycling in accordance with certain aspects disclosed herein.

FIG. 7 is a simplified block diagram 700 illustrating certain aspects of an arbiter 702 that may be adapted or configured to manage traffic and power cycling in accordance with certain aspects disclosed herein. The arbiter 702 may have a channel manager 710 that may include circuits, logic and/or modules configured to monitor data traffic received from a plurality of channels 704. The channel manager 710 may control the operation of queues and/or buffers used to receive data from the plurality of channels 704. In some instances, the arbiter 702 may include, or be coupled to storage devices that operate as buffers and/or queues. The channel manager 710 may include circuits or modules that can determine and monitor queue status. The channel manager 710 may be configured to signal the arbitration logic 712 when data from one or more channels 704 is available for transmission and/or when one or more queues or buffers is empty or congested.

The arbitration logic 712 may include a sequencer and/or state machine adapted to execute one or more arbitration algorithms. The arbitration logic 712 may receive configuration information 706 and channel metrics 716 that may be used to modify and/or tune the arbitration algorithm. The configuration information 706 may include information defining arbitration cycle duration, channel priorities, and/or information defining communications protocols and timing, including maximum packet length, MPR, BWU, clock rates, and other such information. In some instances, the MPR, BWU and other dynamically changing channel parameters may be computed as channel metrics 716 based on information received from the channel manager 710 and/or an interface controller 718, which may provide feedback by monitoring actual data transmissions on a communications link.

The arbitration logic 712 may also receive bus requests related to power cycle management. In one example, power cycle timers and/or counters 714 may be configured using power configuration parameters 708 to generate requests to the arbitration logic 712. The power cycle timers and/or counters 714 may respond to the channel metrics 716 and/or information provided by the arbitration logic 712 to accommodate changes in power-down time as traffic levels increase. For example, the power cycle timers and/or counters 714 and arbitration logic 712 may be dynamically reconfigured to increase the duration of the power-down period when one or more channels has no data to send. The power cycle timers and/or counters 714 may produce one or more signals used to indicate that a power-down of the communications interface is requested.

The interface controller 718 may provide control signals 724 that can be used to control operation of a communications link interface. For example, the interface controller 718 may enable an encoder to receive data from a current channel that has been granted access to the communications link. The interface controller 718 may interact with transmission timing circuitry 720 to determine packet, frame, slot timing, and so on. The transmission timing circuitry 720 may provide clock signals 722 used by encoders, and other transmit and/or receive devices. The interface controller 718 may also control the powering down of the communication interface in response to signals received from the power cycle timers and/or counters 714 and the arbitration logic 712.

In operation, the arbitration algorithm may be configured to track communication link configuration and current traffic conditions in order to provide optimal bandwidth utilization. The arbitration algorithm may provide multi-channel arbitration with support for deterministic traffic with constant bandwidth, as well as non-deterministic traffic that may be substantially random in nature. In one example, non-deterministic traffic may include control traffic, which may have variable bandwidth. According to certain aspects disclosed herein, the arbitration algorithm may be used to implement power state control.

In one example, the arbitration algorithm may be configured to operate as a first-come, first-serve algorithm. The channel manager 710 may assign each channel 704 a wait count, where the wait counts of the various channels 704 may be used to represent the amount of time that a packet from a channel 704 has been waiting for transmission. When a request for packet transfer by one of the channels 704 is granted, its corresponding wait count may be reset (e.g., to a 0 value), while the wait counts of the other channels 704 are increased by 1. The channel with the highest wait count is typically assigned the next grant.

The occurrence of multiple simultaneous requests may be avoided by assigning the request signal of each channel to a time slot. For example, in a 16-channel implementation, 16 consecutive timeslots may be provided.

The arbitration algorithm may be configured to obtain data flows in which packets are transferred in accordance with their respective order of arrival, and where latency is balanced and fair, resulting in optimal bandwidth usage. In various examples, latency may be bound by the periodicity of requests, and an out-of order transfer may increase the likelihood of increased latency. The arbitration algorithm may be configured to handle non-periodic requests naturally, provided adequate bandwidth is available.

The arbitration algorithm may be adapted to handle arbitration related to power cycling. The arbitration algorithm may cause the communication link to assume a low-power state when unused bandwidth available. In other words, bandwidth is fully utilized, either by data traffic or by a low-power state. The period of the low-power state may be modeled as if it were another channel with bandwidth corresponding to the bandwidth not used by the data channels 704. In this way the arbiter 702 can naturally allocate all unused bandwidth for low power state in the most efficient way.

The unused bandwidth may be calculated as:

$$BW_{unused} = BW_{available} - \sum_{all\ channels} BW_{channel}$$

The bandwidth used by a channel may be calculated as:

$$BW_{channel} = sample\ rate_{channel} \times \frac{bytes}{sample_{channel}}$$

The packet rate of a channel may be calculated as:

$$packet\ rate_{channel} = sample\ rate_{channel} \times \left(\frac{samples}{packet_{channel}}\right)^{-1}$$

The packet size of a channel may be calculated as:

$$\frac{bytes}{packet_{unused}} = \frac{BW_{unused}}{packet\ rate_{unused}}$$

Using these calculations, the maximum latency condition may be expressed as:

$$packet\ rate_{unused} = \max_{all\ channels} packet\ rate_{channel}$$

The resulting formula for equivalent unused packet size may be expressed as:

$$\frac{bytes}{packet_{unused}} = \frac{BW_{available} - \sum_{all\ channels} BW_{channel}}{\max_{all\ channels} packet\ rate_{channel}}$$

A virtual channel may be provided for scheduling low-power state using the counters 714. A first of the counters 714 may be used to generate a periodic request that simulates a request generated by the data channels 704. The maximum rate (corresponding to a minimum period) for this counter may be calculated using:

$$packet\ rate_{unused} = \max_{all\ channels} packet\ rate_{channel}$$

A second of the counters 714 may be used to generate the duration of the low-power period, which applies when access is granted to the virtual, or "low-power," channel. This is equivalent to the duty-cycle of an active channel, and hence the byte/packet calculation may be used:

$$\frac{bytes}{packet_{unused}} = \frac{BW_{available} - \sum_{all\ channels} BW_{channel}}{\max_{all\ channels} packet\ rate_{channel}}$$

For any configuration of channels 704 and traffic information (e.g., channel metrics 716), the parameters required for calculation may be constant. Accordingly, these parameters may be stored as a table or embedded in an arbitration algorithm, or calculated on-the-fly as needed or desired. The parameters for a given configuration may be used to program the counters 714 when a channel 704 is added or removed, and/or when data flows associated with one or more of the channels 704 changes. In one example, the counters 714 are reprogrammed before sending data over a channel that is added. In another example, the counters 714 may be reprogrammed after a removed channel stops sending data.

As disclosed herein, the low-power channel absorbs unused bandwidth. The low-power channel may be referred to as a virtual channel or dummy channel. Data traffic received from the data channels 704 may be concentrated in the remaining time period, when the virtual channel is "inactive" (i.e. does not have a grant). The "active" period for the virtual channel may correspond to the raw bandwidth available for low-power state.

Control traffic may be aperiodic and may lack a defined rate. Control traffic may be inserted where the scheduling algorithm can fit it. A formula used to configure the periodic counter may be used to control scheduling for random control traffic or other non-deterministic traffic. That is:

$$\text{packet rate}_{unused} = \max_{all\ channels} \text{packet rate}_{channel}$$

However, the formula for configuring duty cycle may be adjusted as follows:

$$\frac{\text{bytes}}{\text{packet}_{unused}} = \frac{BW_{available} - \sum_{all\ channels} BW_{channel}}{\max_{all\ channels} \text{packet rate}_{channel}} - \sum_{all\ control} \frac{\text{bytes}}{\text{packet}}$$

Control traffic may absorb bandwidth that would otherwise be available for clock gating. A link controller typically generates the control traffic, and the control traffic can be tracked using the counters 714 and/or the channel metrics 716 to count control traffic bytes in a given period. In one example, a control traffic byte counter may be reset whenever the dummy channel is granted access to the communications link, and the available period for low-power state may be automatically and accurately adjusted without intervention by a controller.

Intervention by a processing circuit (controlled by software, for example) may occur when a communications link configuration, a channel configuration, and/or the traffic scenario changes. In one example, reconfiguration may be performed to add or drop a channel. In another example, reconfiguration may be performed to change a phase locked loop (PLL) rate in order to effect a change in total bandwidth. Decisions regarding timing of power state transitions and other decisions related to power state transitions may be taken by counters, comparators and other logic.

Examples of Processing Circuits and Methods

Figure 8:
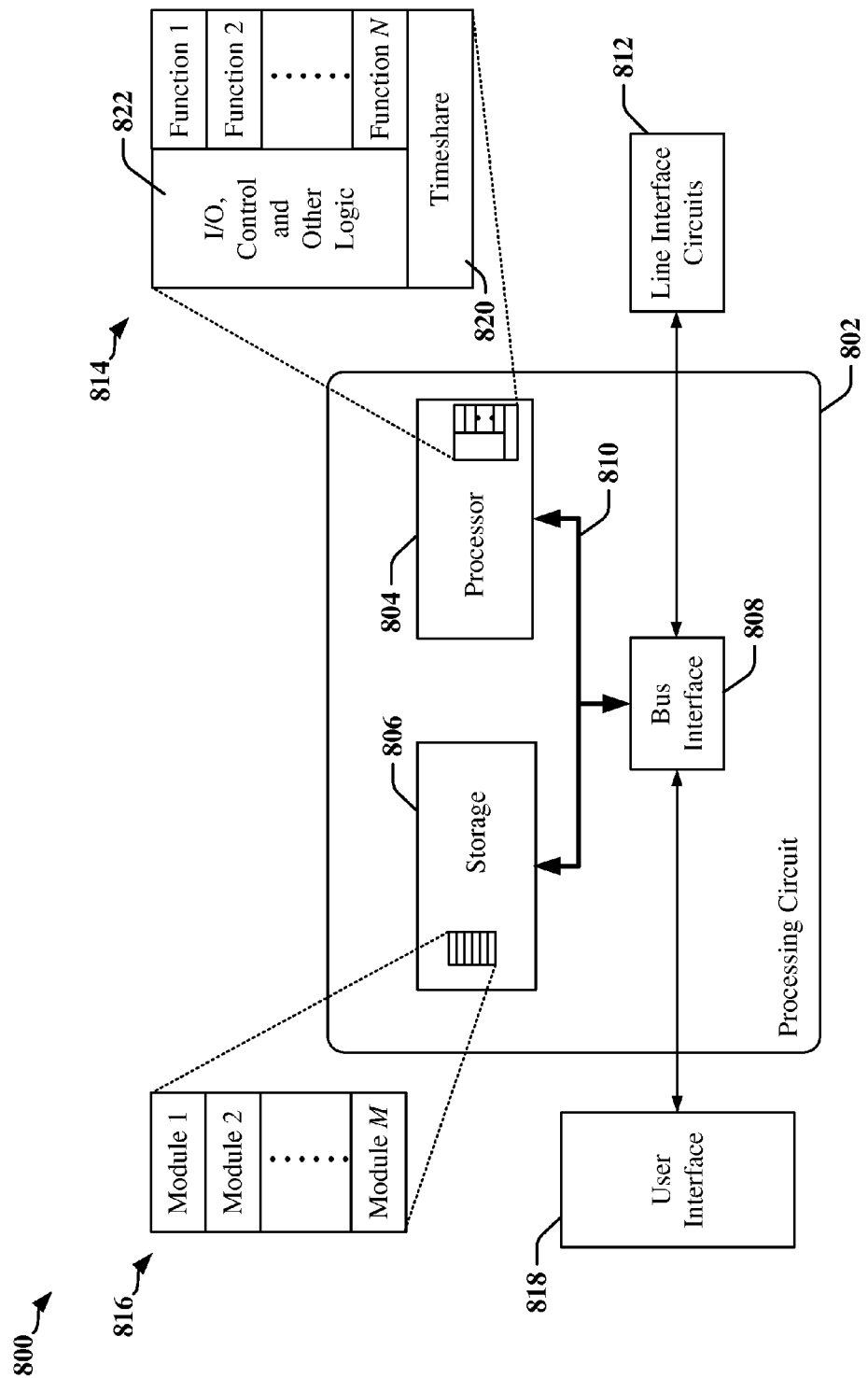
FIG. 8 is a block diagram illustrating an example of an apparatus employing a processing circuit that may be adapted according to certain aspects disclosed herein.

FIG. 8 is a conceptual diagram 800 illustrating a simplified example of a hardware implementation for an apparatus employing a processing circuit 802 that may be configured to perform one or more functions disclosed herein. In accordance with various aspects of the disclosure, an element, or any portion of an element, or any combination of elements as disclosed herein may be implemented using the processing circuit 802. The processing circuit 802 may include one or more processors 804 that are controlled by some combination of hardware and software modules. Examples of processors 804 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 804 may include specialized processors that perform specific functions, and that may be configured, augmented or controlled by one of the software modules 816. The one or more processors 804 may be configured through a combination of software modules 816 loaded during initialization, and further configured by loading or unloading one or more software modules 816 during operation.

In the illustrated example, the processing circuit 802 may be implemented with a bus architecture, represented generally by the bus 810. The bus 810 may include any number of interconnecting buses and bridges depending on the specific application of the processing circuit 802 and the overall design constraints. The bus 810 links together various circuits including the one or more processors 804, and storage 806. Storage 806 may include memory devices and mass storage devices, and may be referred to herein as computer-readable media and/or processor-readable media. The bus 810 may also link various other circuits such as timing sources, timers, peripherals, voltage regulators, and power management circuits. A bus interface 808 may provide an interface between the bus 810 and one or more transceivers 812. A transceiver 812 may be provided for each networking technology supported by the processing circuit. In some instances, multiple networking technologies may share some or all of the circuitry or processing modules found in a transceiver 812. Each transceiver 812 provides a means for communicating with various other apparatus over a transmission medium. Depending upon the nature of the apparatus, a user interface 818 (e.g., keypad, display, speaker, microphone, joystick) may also be provided, and may be communicatively coupled to the bus 810 directly or through the bus interface 808.

A processor 804 may be responsible for managing the bus 810 and for general processing that may include the execution of software stored in a computer-readable medium that may include the storage 806. In this respect, the processing circuit 802, including the processor 804, may be used to implement any of the methods, functions and techniques disclosed herein. The storage 806 may be used for storing data that is manipulated by the processor 804 when executing software, and the software may be configured to implement any one of the methods disclosed herein.

One or more processors 804 in the processing circuit 802 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 806 or in an external computer-readable medium. The external computer-readable medium and/or storage 806 may include a non-transitory computer-readable medium. A non-transitory computer-readable medium includes, by way of example, a magnetic storage device (e.g., hard disk, floppy disk, magnetic strip), an optical disk a CD or a digital versatile disc (DVD)), a smart card, a flash memory device (e.g., a "flash drive," a card, a stick, or a key drive), a RAM, a ROM, a programmable ROM (PROM), an erasable PROM (EPROM), an EEPROM, a register, a removable disk, and any other suitable medium for storing software and/or instructions that may be accessed and read by a computer. The computer-readable medium and/or storage 806 may also include, by way of example, a carrier wave, a transmission line, and any other suitable medium for transmitting software and/or instructions that may be accessed and read by a computer. Computer readable medium and/or the storage 806 may reside in the processing circuit 802, in the processor 804, external to the processing circuit 802, or be distributed across multiple entities including the processing circuit 802. The computer-readable medium and/or storage 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 806 may maintain software maintained and/or organized in loadable code segments, modules, applications, programs, etc., which may be referred to herein as software modules 816. Each of the software modules 816 may include instructions and data that, when installed or loaded on the processing circuit 802 and executed by the one or more processors 804, contribute to a run-time image 814 that controls the operation of the one or more processors 804. When executed, certain instructions may cause the processing circuit 802 to perform functions in accordance with certain methods, algorithms and processes described herein.

Some of the software modules 816 may be loaded during initialization of the processing circuit 802, and these software modules 816 may configure the processing circuit 802 to enable performance of the various functions disclosed herein. For example, some software modules 816 may configure internal devices and/or logic circuits 822 of the processor 804, and may manage access to external devices such as the transceiver 812, the bus interface 808, the user interface 818, timers, mathematical coprocessors, and so on. The software modules 816 may include a control program and/or an operating system that interacts with interrupt handlers and device drivers, and that controls access to various resources provided by the processing circuit 802. The resources may include memory, processing time, access to the transceiver 812, the user interface 818, and so on.

One or more processors 804 of the processing circuit 802 may be multifunctional, whereby some of the software modules 816 are loaded and configured to perform different functions or different instances of the same function. The one or more processors 804 may additionally be adapted to manage background tasks initiated in response to inputs from the user interface 818, the transceiver 812, and device drivers, for example. To support the performance of multiple functions, the one or more processors 804 may be configured to provide a multitasking environment, whereby each of a plurality of functions is implemented as a set of tasks serviced by the one or more processors 804 as needed or desired. In one example, the multitasking environment may be implemented using a timesharing program 820 that passes control of a processor 804 between different tasks, whereby each task returns control of the one or more processors 804 to the timesharing program 820 upon completion of any outstanding operations and/or in response to an input such as an interrupt. When a task has control of the one or more processors 804, the processing circuit is effectively specialized for the purposes addressed by the function associated with the controlling task. The timesharing program 820 may include an operating system, a main loop that transfers control on a round-robin basis, a function that allocates control of the one or more processors 804 in accordance with a prioritization of the functions, and/or an interrupt driven main loop that responds to external events by providing control of the one or more processors 804 to a handling function.

Figure 9:
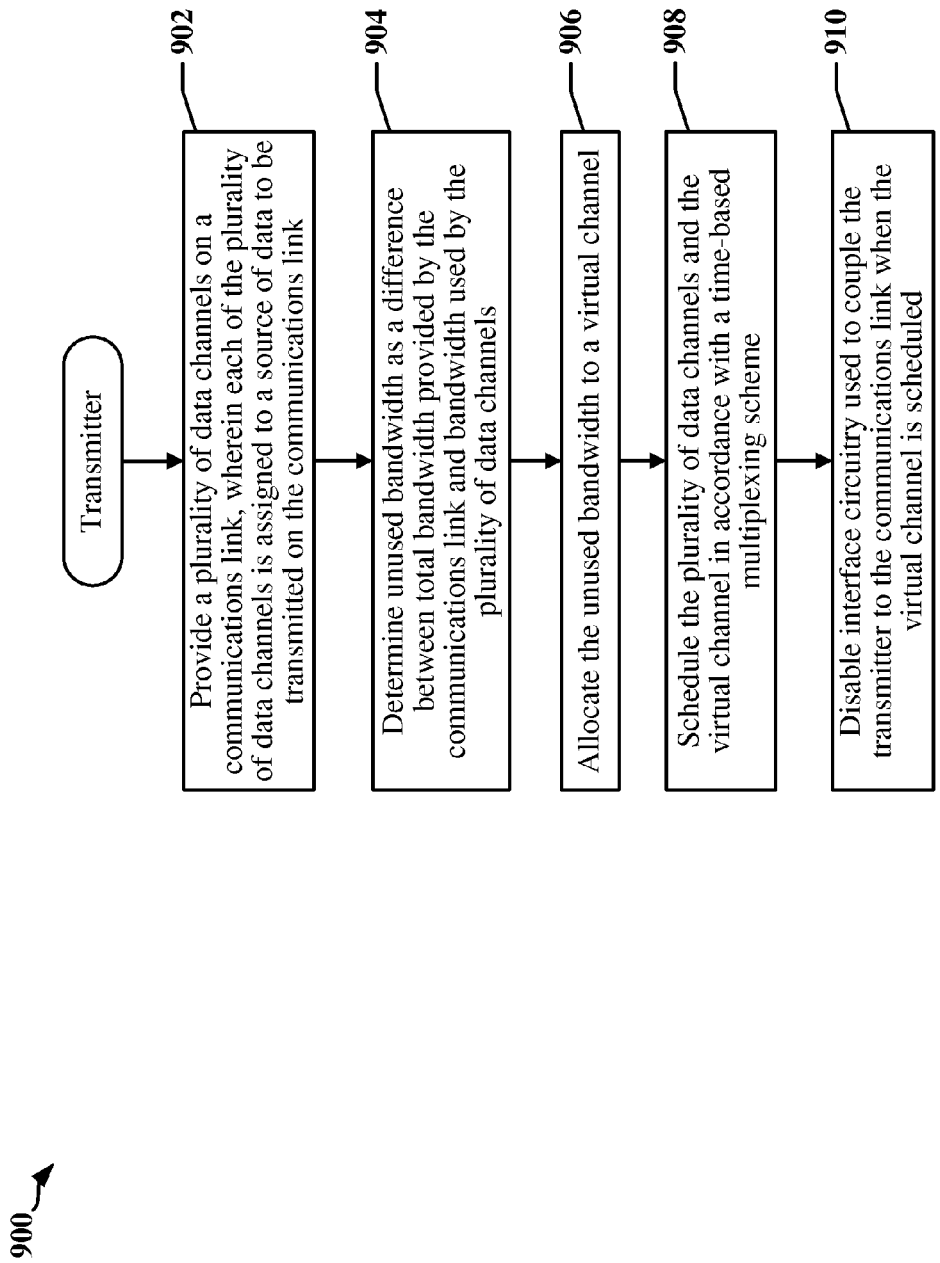
FIG. 9 is a flow chart of a method of managing power usage at a transmitter in accordance with certain aspects disclosed herein.

FIG. 9 is a flow chart 900 of a method of data communication. The method may relate to the management of power usage at a transmitter.

At block 902, a plurality of data channels are provided on a communications link. Each of the plurality of data channels may be assigned to a source of data to be transmitted on the communications link.

At block 904, unused bandwidth may be determined or calculated as a difference between total bandwidth provided by the communications link and bandwidth used by the plurality of data channels. A first portion of the bandwidth used by the plurality of data channels may be allocated for transmitting deterministic data traffic. A second portion of the bandwidth used by the plurality of data channels may be allocated for transmitting non-deterministic data traffic. A third portion of the bandwidth used by the plurality of data channels may be allocated for random control transmissions.

At block 906, the unused bandwidth may be allocated to a virtual channel.

At block 908, the plurality of data channels and the virtual channel may be scheduled in accordance with a time-based multiplexing scheme. The plurality of data channels and the virtual channel may be scheduled using a first-come-first-serve arbitration algorithm.

At block 910, interface circuitry used to couple the transmitter to the communications link may be disabled when the virtual channel is scheduled. In one example, the interface circuitry may be disabled by powering down the interface circuitry for a period time. In another example, the interface circuitry may be disabled by placing the outputs of line drivers into a high impedance mode. In another example, the interface circuitry may be disabled by reducing the frequency of one or more clock signals. In another example, the interface circuitry may be disabled by gating one or more clock signals. As or before the transmitter is being powered down, a signal may be transmitted to a receiver that causes the receiver to power-down. The transmitter may be powered down for a duration calculated based on a ratio of the unused bandwidth to the total bandwidth.

In some instances, a duration of a power cycle is determined or calculated based on a maximum packet rate associated with the plurality of data channels, and a power down period is determined or calculated based on a ratio of the unused bandwidth to the total bandwidth. At least one data channel provides data for transmission at the maximum packet rate.

In some instances, a first channel from the plurality of data channels may be removed, and bandwidth allocated to the virtual channel may be increased by an amount corresponding to an amount of bandwidth released by removing the first channel.

In some instances, a second channel may be added to the plurality of data channels, and a portion of the unused bandwidth may then be reallocated to the second channel.

Figure 10:
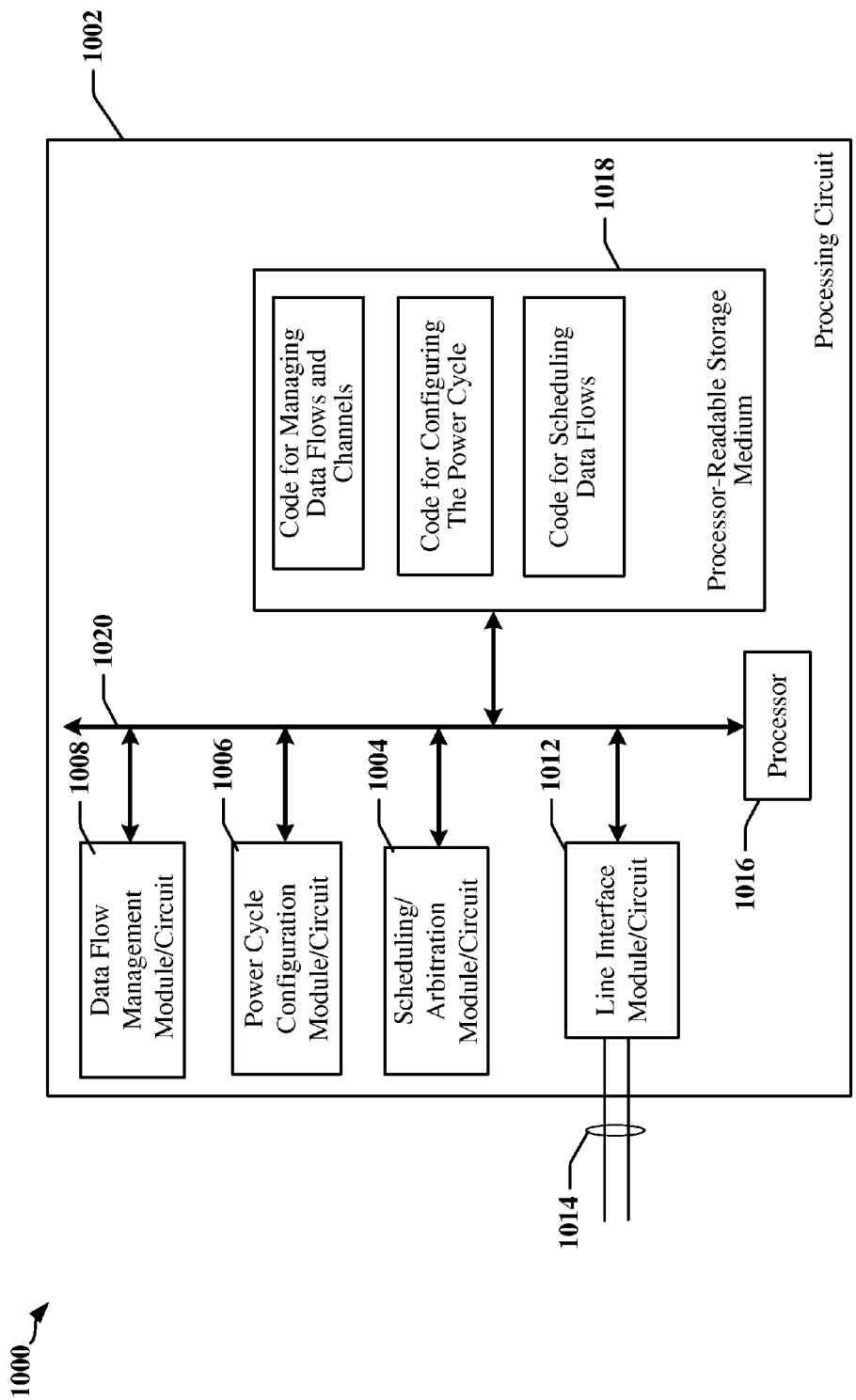
FIG. 10 is a diagram illustrating an example of a hardware implementation for a transmitting apparatus employing a processing employing a processing circuit adapted according to certain aspects disclosed herein.

FIG. 10 is a diagram illustrating a simplified example of a hardware implementation for an apparatus 1000 employing a processing circuit 1002. The processing circuit typically has a processor 1016 that may include one or more of a microprocessor, microcontroller, digital signal processor, a sequencer and a state machine. The processing circuit 1002 may be implemented with a bus architecture, represented generally by the bus 1020. The bus 1020 may include any number of interconnecting buses and bridges depending on the specific application of the processing circuit 1002 and the overall design constraints. The bus 1020 links together various circuits including one or more processors and/or hardware modules, represented by the processor 1016, the modules or circuits 1004, 1006 and 1008, line interface circuits 1012 configurable to communicate over connectors or wires of the communications link 1014 and the computer-readable storage medium 1018. The bus 1020 may also link various other circuits such as timing sources, peripherals, voltage regulators, and power management circuits, which are well known in the art, and therefore, will not be described any further.

The processor 1016 is responsible for general processing, including the execution of software stored on the computer-readable storage medium 1018. The software, when executed by the processor 1016, causes the processing circuit 1002 to perform the various functions described supra for any particular apparatus. The computer-readable storage medium 1018 may also be used for storing data that is manipulated by the processor 1016 when executing software, including data decoded from symbols transmitted over the connectors of the communication link 1014, which may be configured as data lanes and clock lanes. The processing circuit 1002 further includes at least one of the modules 1004, 1006, 1008, and 1010. The modules 1004, 1006, 1008, and 1010 may be software modules running in the processor 1016, resident/stored in the computer-readable storage medium 1018, one or more hardware modules coupled to the processor 1016, or some combination thereof. The modules 1004, 1006, 1008, and/or 1010 may include microcontroller instructions, state machine configuration parameters, or some combination thereof.

In one configuration, the apparatus 1000 for wireless communication includes a module and/or circuit 1004 that is configured to schedule data flows received from a plurality of data sources and a virtual flow used to implement power cycling, a module and/or circuit 1006 configured to control and manage timing of the power cycle, and a module and/or circuit 1008 configured to manage data flows and their allocation to channels on the communication link 1014.

The various modules and/or circuits of the apparatus 1000 may be provided in a transmitting device coupled to the communication link 1014. For example, the transmitting device may include line interface circuits 1012 adapted to couple the apparatus to a communications link, encoding circuitry configured to receive a data stream from each of a plurality of channels, and an arbiter configured to calculate unused bandwidth as a difference between total bandwidth provided by the communications link and bandwidth used by the plurality of channels, allocate the unused bandwidth to a virtual channel, and schedule the plurality of channels and the virtual channel in accordance with a time-based multiplexing scheme. At least a transmitter portion of the interface circuitry is disabled when the virtual channel is scheduled.

In some instances, a first portion of the bandwidth used by the plurality of channels is allocated for deterministic data transmissions. A second portion of the bandwidth used by the plurality of channels may be allocated for non-deterministic data transmissions. A third portion of the bandwidth used by the plurality of channels may be allocated for random control transmissions.

In some instances, the arbiter is configured to schedule the plurality of channels and the virtual channel in accordance with a time-based multiplexing scheme based on a power cycle, and calculate a power down period based on a ratio of the unused bandwidth to the total bandwidth. A duration of a power cycle may be determined based on a maximum packet rate associated with at least one data channel. The bandwidth allocated to the virtual channel may be increased by an amount corresponding to an amount of bandwidth released when a channel is removed from the plurality of channels. A portion of the unused bandwidth may be reallocated to a new channel when the new channel is added to the plurality of channels.

The arbiter may be configured to use a first-come-first-serve arbitration algorithm.

It is understood that the specific order or hierarchy of steps in the processes, disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later conic to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for managing power usage at a transmitter, comprising:
    providing a plurality of data channels on a communications link, wherein each of the plurality of data channels is assigned to a source of data to be transmitted on the communications link;
    determining unused bandwidth as a difference between total bandwidth provided by the communications link and bandwidth used by the plurality of data channels;
    allocating the unused bandwidth to a virtual channel;
    using a power cycle to schedule the plurality of data channels together with the virtual channel in accordance with a time-based multiplexing scheme, wherein each of the virtual channel and one or more data channels are granted access to the communication link when scheduled;
    calculating a power down period of the power cycle based on a ratio of the unused bandwidth to the total bandwidth; and
    disabling interface circuitry used to couple the transmitter to the communications link when the virtual channel is scheduled,
    wherein a duration of the power cycle is determined based on a maximum packet rate associated with at least one data channel, and
    wherein the bandwidth allocated to the virtual channel is increased by an amount corresponding to an amount of bandwidth released when a channel is removed from the plurality of data channels.

2. The method of claim 1, wherein a first portion of the bandwidth used by the plurality of data channels is allocated for transmitting deterministic data traffic.

3. The method of claim 2, wherein a second portion of the bandwidth used by the plurality of data channels is allocated for transmitting non-deterministic data traffic.

4. The method of claim 2, wherein a third portion of the bandwidth used by the plurality of data channels is allocated for random control transmissions.

5. The method of claim 1, wherein disabling the interface circuitry comprises:
powering down the interface circuitry for a period time.

6. The method of claim 1, further comprising:
determining a duration of a power cycle based on a maximum packet rate associated with the plurality of data channels; and
calculating a power down period based on a ratio of the unused bandwidth to the total bandwidth,
wherein at least one data channel provides data for transmission at the maximum packet rate.

7. The method of claim 1, wherein powering down the transmitter comprises:
transmitting a signal to a receiver that causes the receiver to power-down; and
powering-down the transmitter for a duration calculated based on a ratio of the unused bandwidth to the total bandwidth.

8. The method of claim 1, wherein scheduling the plurality of data channels and the virtual channel comprises:
using a first-come-first-serve arbitration algorithm.

9. The method of claim 1, further comprising:
removing a first channel from the plurality of data channels; and
increasing bandwidth allocated to the virtual channel by an amount corresponding to an amount of bandwidth released by removing the first channel.

10. The method of claim 1, further comprising:
adding a second channel to the plurality of data channels; and
reallocating a portion of the unused bandwidth to the second channel.

11. An apparatus, comprising:
interface circuitry adapted to couple the apparatus to a communications link;
encoding circuitry configured to receive a data stream from each of a plurality of channels; and
an arbiter configured to:
calculate unused bandwidth as a difference between total bandwidth provided by the communications link and bandwidth used by the plurality of channels;
allocate the unused bandwidth to a virtual channel;
use a power cycle to schedule the plurality of channels together with the virtual channel in accordance with a time-based multiplexing scheme, wherein each of the virtual channel and one or more channels are granted access to the communication link when scheduled; and
calculate a power down period based on a ratio of the unused bandwidth to the total bandwidth,
wherein at least a transmitter portion of the interface circuitry is disabled when the virtual channel is scheduled,
wherein a duration of the power cycle is determined based on a maximum packet rate associated with at least one data channel, and
wherein the bandwidth allocated to the virtual channel is increased by an amount corresponding to an amount of bandwidth released when a channel is removed from the plurality of channels.

12. The apparatus of claim 11, wherein a first portion of the bandwidth used by the plurality of channels is allocated for deterministic data transmissions.

13. The apparatus of claim 12, wherein a second portion of the bandwidth used by the plurality of channels is allocated for non-deterministic data transmissions.

14. The apparatus of claim 12, wherein a third portion of the bandwidth used by the plurality of channels is allocated for random control transmissions.

15. The apparatus of claim 11, wherein a portion of the unused bandwidth is reallocated to a new channel when the new channel is added to the plurality of channels.

16. The apparatus of claim 11, wherein the arbiter is configured to use a first-come-first-serve arbitration algorithm.

17. An apparatus, comprising:
means for providing a plurality of data channels on a communications link, wherein each of the plurality of data channels is assigned to a source of data to be transmitted on the communications link;
means for determining unused bandwidth as a difference between total bandwidth provided by the communications link and bandwidth used by the plurality of data channels, wherein the unused bandwidth is allocated to a virtual channel; and
means for scheduling the plurality of data channels together with the virtual channel in accordance with a time-based multiplexing scheme, wherein the means for scheduling the plurality of data channels and the virtual channel is configured using a duration of a power cycle that is based on a maximum packet rate associated with the plurality of data channels, a power down period calculated as a ratio of the unused bandwidth to the total bandwidth, wherein at least one data channel provides data for transmission at the maximum packet rate, and wherein each of the virtual channel and one or more data channels are granted access to the communication link when scheduled,
wherein interface circuitry used to couple the apparatus to the communications link is disabled when the virtual channel is scheduled, and
wherein the bandwidth allocated to the virtual channel is increased by an amount corresponding to an amount of bandwidth released when a channel is removed from the plurality of data channels.

18. The apparatus of claim 17, wherein a first portion of the bandwidth used by the plurality of data channels is allocated for deterministic data traffic.

19. The apparatus of claim 18, wherein a second portion of the bandwidth used by the plurality of data channels is allocated for non-deterministic data traffic.

20. The apparatus of claim 18, wherein a third portion of the bandwidth used by the plurality of data channels is allocated for control information.

21. The apparatus of claim 17, wherein the means for scheduling the plurality of data channels and the virtual channel is configured to use a first-come-first-serve arbitration algorithm.

22. The apparatus of claim 17, wherein the means for providing the plurality of data channels is configured to:
remove a first channel from the plurality of data channels,
wherein the bandwidth allocated to the virtual channel is increased by an amount corresponding to an amount of bandwidth allocated to the first channel.

23. The apparatus of claim 17, wherein the means for providing the plurality of data channels is configured to:
add a second channel to the plurality of data channels,
wherein a portion of the unused bandwidth is reallocated to the second channel.

24. A non-transitory processor-readable storage medium having one or more instructions stored thereon which, when executed by at least one processing circuit, cause the at least one processing circuit to:

provide a plurality of data channels on a communications link, wherein each of the plurality of data channels is assigned to a source of data to be transmitted on the communications link;
determine unused bandwidth as a difference between total bandwidth provided by the communications link and bandwidth used by the plurality of data channels;
allocate the unused bandwidth to a virtual channel;
determine a duration of a power cycle based on a maximum packet rate associated with at least one data channel of the plurality of data channels;
use the power cycle to schedule the plurality of data channels together with the virtual channel in accordance with a time-based multiplexing scheme, wherein each of the virtual channel and one or more data channels are granted access to the communication link when scheduled;
calculate a power down period based on a ratio of the unused bandwidth to the total bandwidth; and
disable interface circuitry used to couple the at least one processing circuit to the communications link when the virtual channel is scheduled,
wherein at least one data channel provides data for transmission at the maximum packet rate, and
wherein the bandwidth allocated to the virtual channel is increased by an amount corresponding to an amount of bandwidth released when a channel is removed from the plurality of data channels.

25. The storage medium of claim 24, wherein a first portion of the bandwidth used by the plurality of data channels is allocated for transmitting deterministic data traffic, a second portion of the bandwidth used by the plurality of data channels is allocated for transmitting non-deterministic data traffic, and a third portion of the bandwidth used by the plurality of data channels is allocated for random control transmissions.

26. The storage medium of claim 24, wherein the instructions cause the at least one processing circuit to:
transmit a signal to a receiver when the virtual channel is scheduled, the signal causing the receiver to power-down; and
powering-down the at least one processing circuit for a duration calculated based on a ratio of the unused bandwidth to the total bandwidth.

* * * * *